United States Patent [19]

Hascal et al.

[11] Patent Number: 4,618,774

[45] Date of Patent: Oct. 21, 1986

[54] INSTRUMENT FOR MEASURING LEVELS OF CONCENTRATION OF TRITIUM AND TRITIUM OXIDES IN AIR

[76] Inventors: Marcel Hascal, 1 Boldmere Crescent, Willowdale, Ontario, Canada, M2J 2R8; Adrian Mihai, 181 Robert Hicks Dr., Willowdale, Ontario, Canada, M2R 3R3; Robert C. Hanrahan, 302 Woodbine Ave., Toronto, Ontario, Canada, M4L 3P4

[21] Appl. No.: 639,798

[22] Filed: Aug. 13, 1984

[51] Int. Cl.[4] ............................ G01T 1/20; G01T 7/02
[52] U.S. Cl. .................................... 250/364; 250/304; 250/429; 250/432 R
[58] Field of Search ................. 250/364, 432 R, 380, 250/303, 304, 429, 367

[56] References Cited

U.S. PATENT DOCUMENTS

| | | | |
|---|---|---|---|
| 3,558,883 | 1/1971 | Bench et al. | 250/370 |
| 3,621,238 | 11/1971 | Jalbert | 250/380 |
| 3,999,066 | 12/1976 | Osborne et al. | 250/364 |
| 4,019,864 | 4/1977 | Saito et al. | 250/303 |

FOREIGN PATENT DOCUMENTS 57-28277  2/1982  Japan .................................. 250/364

Primary Examiner—Carolyn E. Fields
Attorney, Agent, or Firm—Ridout & Maybee

[57] ABSTRACT

An instrument for measuring levels of concentration of tritium and tritium oxides in environmental air includes a scintillation detector, such as a photomultiplier, and a controlled device for exposing scintillators to the detector in succession. Air being monitored is passed over the scintillators. A thermoelectric device is used to cool and warm one of the scintillators for condensing air moisture onto its surface and for evaporating moisture from it, the count rate being measured in both instances. The other scintillator is a reference scintillator, the count rate from which is also measured, and a measurement is taken with neither of the scintillators exposed to the scintillation detector. The concentration levels of tritium and tritium oxides are computed from the set of measurements.

17 Claims, 8 Drawing Figures

INSTRUMENT FOR MEASURING LEVELS OF CONCENTRATION OF TRITIUM AND TRITIUM OXIDES IN AIR

FIELD OF THE INVENTION

This invention relates to an instrument for measuring levels of concentration of tritium and tritium oxides in environmental air. The invention is applicable, for example, to the monitoring of tritium levels in the vicinity of nuclear power stations or other establishments where tritium may present a potential hazard.

Tritium may be present in air in an elemental form or in a combined form as tritiated water vapour, and since it presents a much greater health hazard in the latter form it is important that a tritium monitoring system should be capable of distinguishing between the two forms. A measuring instrument in accordance with the present invention is particularly adapted to accomplish this. Morover, in cases where the air has to be monitored in the presence of background radiation such as gamma radiation and beta-radiation emitting radioactive gases, it is important that the system should be capable of distinguishing signals attributable to the tritium from signals attributable to the background radiation. A measuring instrument in accordance with the present invention is particularly adapted to accomplish this.

SUMMARY OF THE INVENTION

Basically, a measuring instrument in accordance with one aspect of the invention for measuring levels of concentration of tritium oxides and/or elemental tritium in air comprises: an instrument housing providing an inlet and an outlet for air to be monitored, a light sensing device mounted therein, circuit means connected to the light sensing device for deriving output signals proportional to the amount of light sensed therefrom, a thermally conductive mounting plate providing a mounting surface spaced from the light sensing device for mounting a scintillator in viewing relationship thereto, means for flowing air to be monitored through the space between the mounting plate and the light sensing device, means for selectively cooling and warming the mounting plate for condensing air moisture onto the scintillator and evaporating condensed moisture therefrom and means for selectively exposing the scintillator to the light sensing device at timed intervals and for timed durations.

The light sensing device may be a photomultiplier having a window. The means for selectively exposing the scintillator to the light sensing device may comprise a shutter which is selectively movable across the field of view of said device, and means for selectively operating the shutter at timed intervals.

Preferably, means for selectively exposing the scintillator to the light sensing device at timed intervals includes a shutter in the form of an opaque disc having an aperture which in one position of the shutter is aligned with the window of the photomultiplier for exposing the scintillator thereto, and further providing means for locating a reference scintillator at a position such that in a second position of the shutter the reference scintillator is exposed to the window, the shutter being operated so as to expose the scintillators to the window sequentially at timed intervals and for timed durations.

The output signals from the light sensing device must be processed to derive a signal representative of tritium oxide concentration, which signal can be applied to a suitable display device. The signal processor and the display device may be separate components or they can be incorporated into the instrument.

According to another aspect of the present invention there is provided an instrument for measuring levels of concentration of tritium oxides in air, comprising an instrument housing providing an internal air flow path for air to be monitored, said air flow path having an inlet and an outlet, a light sensing device mounted in the housing, the light sensing device having a window, circuit means connected to the light sensing device for deriving output signs therefrom proportional to the amount of light sensed, a temperature sensor located in the air flow path for sensing the temperature of air being monitored, a humidity sensor located in the air flow path for sensing the humidity of air being monitored, a thermally conductive mounting plate providing a mounting surface spaced from the light sensing device window for mounting a first scintillator in viewing relationship thereto, means for selectively cooling and warming the mounting plate for condensing air moisture onto the scintillator and evaporating condensed moisture therefrom, a shutter which is movable across the field of view of said window, the shutter having an aperture which in one position of the shutter is aligned with the window for exposing said first scintillator thereto, and further providing means for locating a reference scintillator at a position such that in the second position of the shutter the reference scintillator is exposed to the window, means for selectively operating the shutter at time intervals for sequentially exposing the scintillators to the window for timed durations, and signal processing means responsive to the outputs of the temperature sensor and humidity sensor and sequential output signals from the light sensing device for deriving therefrom a signal representative of tritium oxide concentration.

BRIEF DESCRIPTION OF THE DRAWINGS

In order that the invention may be more readily understood, one such measuring instrument will now be described, by way of example, with reference to the accompanying drawings, in which.

DESCRIPTION OF THE PREFERRED EMBODIMENT

Figure 1:
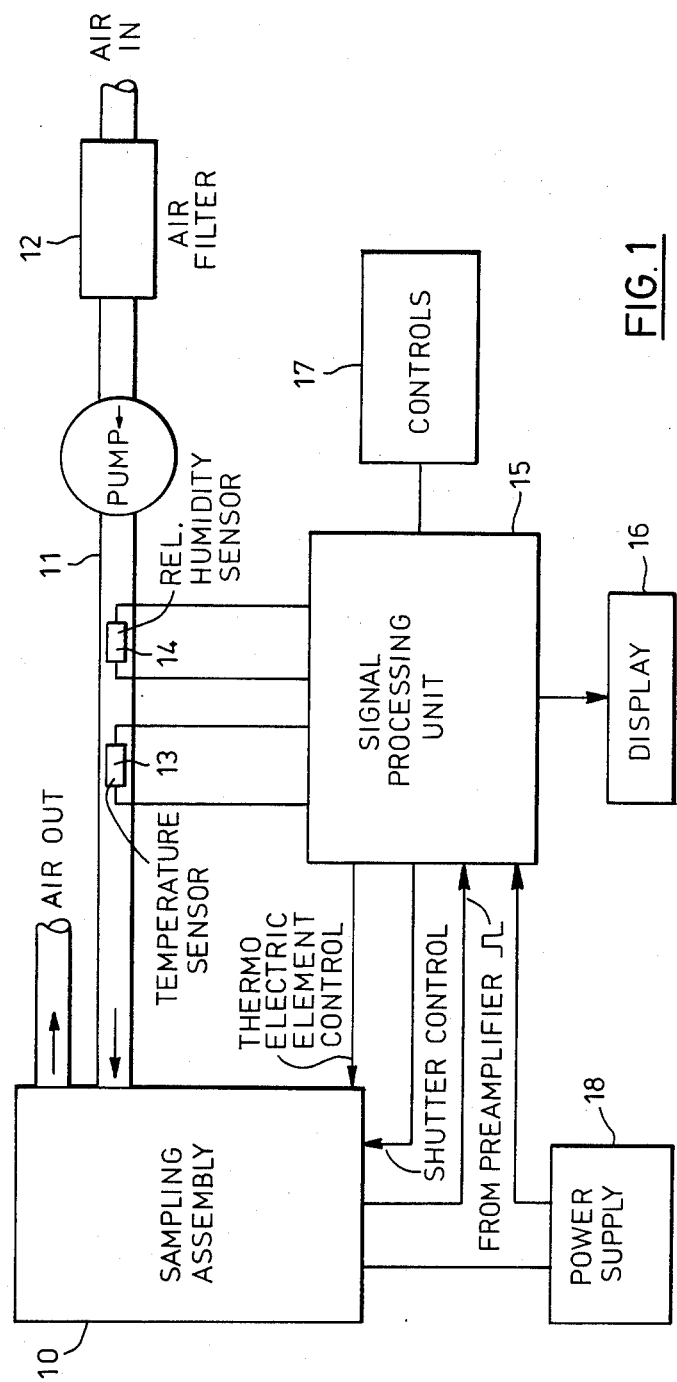
FIG. 1 is a schematic block diagram of a monitoring system for measuring levels as of concentration of tritium and tritium oxides in environmental air.

Before considering the details of the instrument itself it will be appropriate to consider the measurement procedure for which it is particularly designed and also the calibration procedure suitable for this instrument.

The Measurement Procedure

The procedure involves bringing the scintillators sequentially to a scintillation detector, such as a photomultiplier tube, in order to detect and count the scintillations produced in each of them during predetermined times. The first scintillator comprises a thin film of scintillator material, more than 0.7 mg/cm² thick but not more than 5 mg/cm² thick, mounted on a light reflecting substrate whose temperature can be controlled for the purpose of condensing air moisture onto the scintillator and evaporating condensed moisture from it. The second scintillator (referred to herein as the "reference scintillator") also comprises a thin film of scintillator material of the same thickness as the first, and completely covered by a transparent layer of non-scintillating material more than 0.7 mg/cm² thick but not more than 5 mg/cm² thick, for the purpose of preventing the sampled air from reaching the surface of the scintillator.

The measurement procedure for measuring the concentration of tritium oxides in air and the concentration of elemental tritium in air consists of the following steps, wherein the scintillators are exposed to the detector sequentially in the presence of the sampled air:

(a) Measure the signal from the light sensing device resulting from scintillations in the first scintillator while it is covered with moisture condensed from the sampled air. Let the measured value be $K_1$.

(b) Measure the signal from the light sensing device resulting from scintillations in the first scintillator after the moisture has been evaporated from it. Let this value be $K_2$.

(c) Measure the signal from the light sensing device when neither the first nor second scintillator is exposed to it. Let this value be $K_3$.

Then the concentration ($H_w$) of tritium oxides in the water present in the sampled air is given by $$H_w = m_1 K_1 + m_2 K_2 + m_3 K_3$$

where $m_1$, $m_2$ and $m_3$ are calibration factors.

The concentration ($H_a$) of tritium oxides in the air is therefore given by $$H_a = H_w \times G(RH,T)$$

where the function $G(RH,T)$ is a known function of relative humidity and temperature. The relative humidity and temperature may already be known or they may be separately measured during the procedure.

The concentration ($H_t$) of elemental tritium in the air is given by $$H_t = n_1 K_1 + n_2 K_2 + n_3 K_3$$

where $n_1$, $n_2$ and $n_3$ are calibration factors.

Where the measuring procedure is to be carried out in the presence of beta-emitting radioactive gases, the measurement procedure for measuring the concentration of tritium oxides in air and the concentration of elemental tritium in air consists of the following steps, wherein the scintillators are exposed to the detector sequentially in the presence of the sampled air:

(a) Measure the signal from the light sensing device resulting from scintillations in the first scintillator while it is covered with moisture condensed from the sampled air. Let the measured value be $K_1$.

(b) Measure the signal from the light sensing device resulting from scintillations in the first scintillator after the moisture has been evaporated from it. Let this value be $K_2$.

(c) Measure the signal from the light sensing device resulting from scintillations in the second scintillator (i.e. reference scintillator). Let this value be $K_3$.

(d) Measure the signal from the light sensing device when neither the first nor the second scintillator is exposed to it. Let this value be $K_4$.

Then the concentration ($H_w$) of tritium oxides in the water present in the sampled air is given by $$H_w = m_1 K_1 + m_2 K_2 + m_3 K_3 + m_4 K_4$$

where $m_1$, $m_2$, $m_3$ and $m_4$ are calibration factors.

The concentration ($H_a$) of tritium oxides in the air is therefore given by $$H_a = H_w \times G(RH,T)$$

where the function $G(RH,T)$ is a known function of relative humidity and temperature. The relative humidity and temperature may already be known or they may be separately measured during the procedure.

The concentration ($H_t$) of elemental tritium in the air is given by $$H_t = n_1 K_1 + n_2 K_2 + n_3 K_3$$

where $n_1$, $n_2$, and $n_3$ are calibration factors.

In order to determine the calibration factors one must follow the calibration procedure outlined below, which may be performed manually or by a programmed controller.

The Calibration Procedure (a) Provide to the instrument a sample of clean air, not containing any radioactive substances, under constant and normal conditions of temperature and relative humidity. Perform Step (b) of the measurement procedure and let the result be B.

(b) Provide to the instrument a sample of a mixture of clean air and a radioactive beta-emitting gas emitting beta particles of maximum energy not less than 100 KeV. Perform Steps (a), (b), (c) and (d) of the measurement procedure and let the results be $A_1$, $A_2$, $A_3$ and $A_4$ respectively.

(c) Provide to the instrument a sample of a mixture of clean air and elemental tritium such that the concentration of elemental tritium is one unit. Perform Steps (a), (b) and (d) of the measurement procedure and let the results be $B_1$, $B_2$ and $B_4$, respectively.

(d) Provide to the instrument a sample of air containing tritiated water vapour such that the concentration of tritium oxides in the water is one unit. Perform Step (a) of the measurement procedure and let the result be $C_1$.

The calibration factors are calculated as follows:

$$m_1 = -\frac{(a_4 - a_3)b_2 - (a_2 - a_3)b_4}{c_1 b_4 (a_2 - a_3) - c_1 b_2 (a_4 - a_3)}$$

$$m_2 = \frac{(a_4 - a_3)b_1 - (a_1 - a_3)b_4}{c_1 b_4 (a_2 - a_3) - (a_4 - a_3) c_1 b_2}$$

$$m_3 = \frac{(a_1 - a_4)(b_2 - b_4) - (a_2 - a_4)(b_1 - b_4)}{c_1 b_4 (a_2 - a_3) - (a_4 - a_3) c_1 b_2}$$

$$m_4 = \frac{(a_1 - a_3)b_2 - (a_2 - a_3)b_1}{c_1 b_4 (a_2 - a_3) - c_1 b_2 (a_4 - a_3)}$$

$$n_1 = 0$$

-continued $$n_2 = -\frac{(a_4 - a_3)}{b_4(a_2 - a_3) - b_2(a_4 - a_3)}$$

$$n_3 = \frac{(a_2 - a_4)}{b_4(a_2 - a_3) - b_2(a_4 - a_3)}$$

$$n_4 = \frac{(a_2 - a_3)}{b_4(a_2 - a_3) - b_2(a_4 - a_3)}$$

where
$a_i = A_i - B$
$b_i = B_i - B$
$c_1 = C_1 - B$.

The Monitoring System

Referring to FIG. 1, at the heart of the monitoring system is a sampling assembly 10. The sampling assembly will be described in detail with references to FIGS. 2, 3 and 4, but for the present it is sufficient to mention that the sampling assembly comprises a photomultiplier having an output circuit, a thermally conductive mounting plate providing a light-reflecting mounting surface for mounting a scintillator in viewing relationship to the window of the photomultiplier, and means for selectively cooling and warming the mounting plate for condensing air moisture onto the scintillator and for evaporating condensed moisture therefrom. A shutter is movable across the field of the view of the photomultiplier, and in the present example provides means for mounting a reference scintillator at a position such that movement of the shutter through a complete cycle across the field of view will expose the scintillators to the window in sequence. The shutter and the above-mentioned cooling and warming means are, of course, controlled so as to effect the various measurements described above under "The Measurement Procedure".

Air to be monitored is supplied to the sampling assembly via an air flow path shown as a duct 11, so as to flow across each of the scintillators when in the viewing position. The incoming air is filtered by a filter 12, and sensors 13, 14 are positioned in the air flow path for measuring the temperature and relative humidity of the incoming air. The temperature sensor 13 in the present example is a solid state device, AD590 supplied by Analog Device Incorporated; this is an integrated circuit device which furnishes an analogue output proportional to temperature, and is described in U.S. Pat. No. 4,123,698. The relative humidity sensor 14 is also a solid state device, component PC-2101 supplied by Thunder Scientific Corporation, which is an integrated circuit device furnishing an analogue output signal proportional to relative humidity. The signals from these devices and the output signals from the photomultiplier are processed by a microprocessor 15, which is suitably programmed so as to furnish the numerical values of $H_a$ and $H_t$ in accordance with the formulae discussed previously. The numerical outputs of the microprocessor are also applied to a conventional display device 16. A control panel 17 provides the usual controls ON/OFF, CLEAR, and RESET.

A power supply for the photomultiplier is shown at 18.

Besides processing the data which is applied to it, the microprocessor is programmed also to furnish control signals for controlling the shutter of the sampling assembly and controlling the cooling and warming of the scintillator mounting plate so that the various steps of the measurement procedure will be carried out in the required sequence and for the required durations. Microprocessors suitable for the purpose are available commercially from numerous suppliers and these can be programmed routinely according to the functions required of them.

The Measuring Instrument

Figure 2:
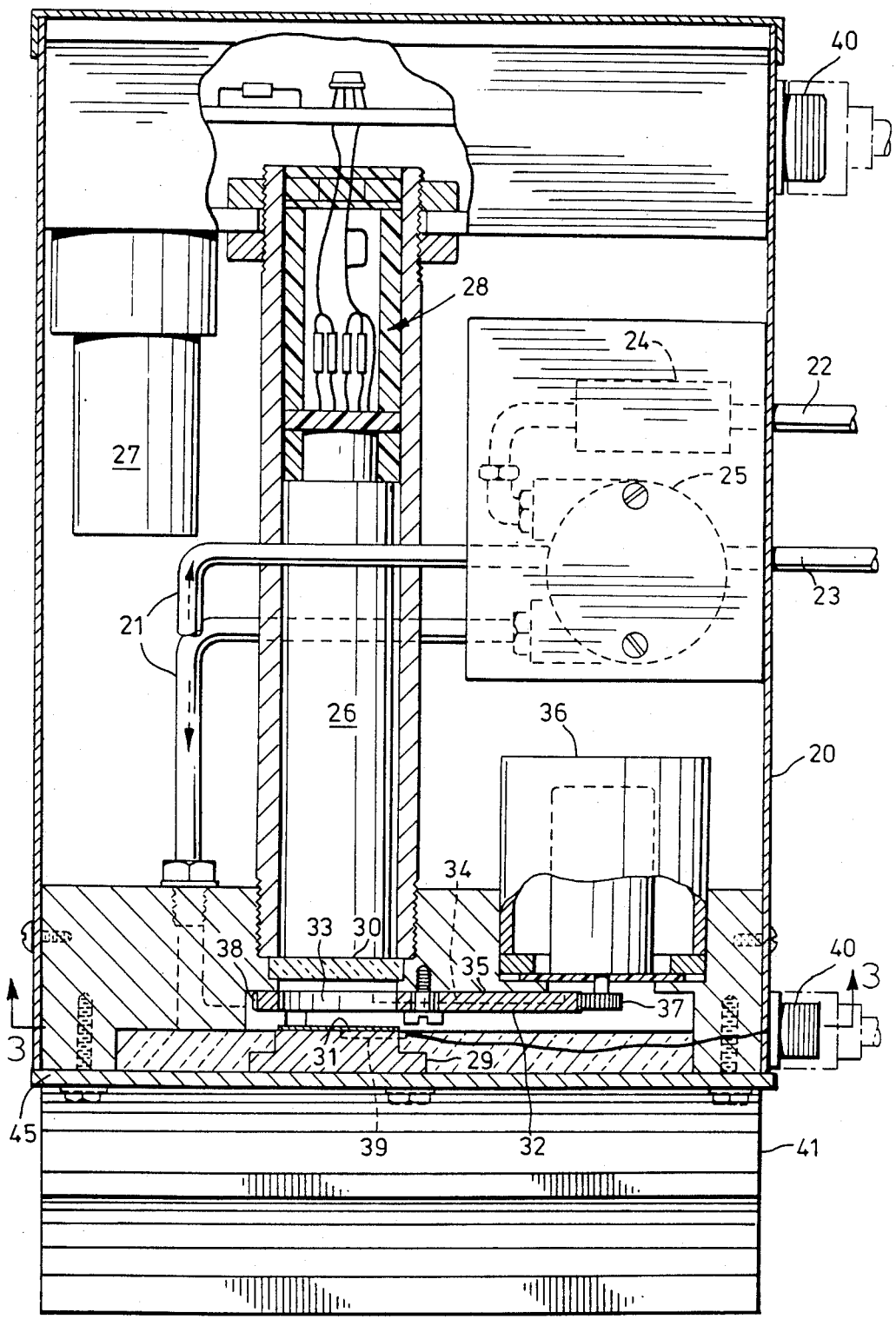
FIG. 2 is a sectional view of an instrument used in the monitoring system of FIG. 1.
Figure 3:
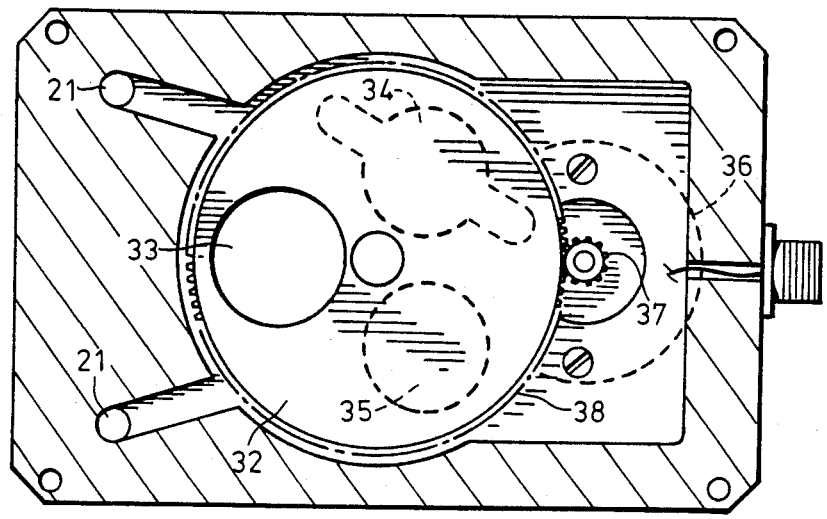
FIG. 3 is an underneath sectional plan view taken on line 3—3 in FIG. 2.
Figure 4:
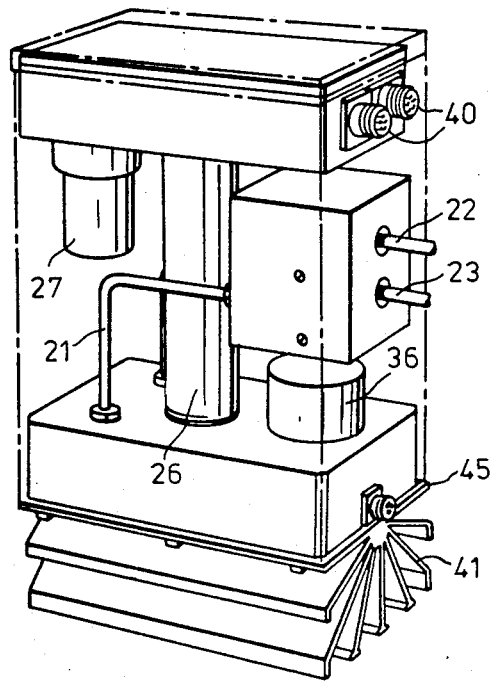
FIG. 4 is a perspective view of the instrument with the housing removed to reveal internal parts.

Referring now to FIGS. 2–4, the measuring instrument of the present example comprises essentially an instrument housing 20 of aluminium providing an internal flow path 21 for air to be monitored, the housing providing an air inlet 22 and an air outlet 23. An air filter 24 is connected to the inlet 22 for filtering incoming air which is pumped along the flow path by a pump 25. A photomultiplier tube 26 (Model D908D supplied by EMI) is mounted in the housing 20, and a power supply 27 for operating the photomultiplier forms part of the electrical system of the instrument. The electrical system, denoted generally by numeral 28, further comprises an output circuit for the photomultiplier including a preamplifier.

The temperature sensor 13 and relative humidity sensor 14 of FIG. 1 may be located anywhere along the air flow path 21.

Mounted on a thermally conductive plate 45 on the floor of the housing 20 is a thermally conductive mounting block 29, preferably of aluminium, which incorporates a thermoelectric device 39 controlled by the signal processor 15 (FIG. 1) so as to cool or warm the mounting block as required. The mounting block 29 provides a light reflecting upper mounting surface spaced from the window 30 of the photomultiplier for mounting a scintillator 31 in viewing relationship to the window. A shutter 32 in the form of an opaque disc rotatable about its axis is positioned so as to interrupt the field of view between the photomultiplier window 30 and the scintillator 31. The shutter has a circular aperture 33 which, in one position of the shutter, is aligned with the photomultiplier window so as to expose the scintillator 31 to it. The shutter 32 also provides on its upper side a well 34 which is spaced 120° from the aperture 33. This well, the base of which is light reflecting, serves to locate and mount a reference scintillator 42, and is positioned so that in a second position of the shutter the reference scintillator 42 is exposed to the photomultiplier 30, the scintillator 31 being shielded by the shutter. In a third position 35 of the shutter 32 the scintillator 31 is shielded from, and the reference scintillator is remote from, the photomultiplier window 30.

The shutter 32 thus has three operative positions, a first and a second of which a respective one of the scintillators is exposed to the photomultiplier window, and a third of which neither scintillator is so exposed. For the purpose of moving the shutter to each of its three operative positions in the required sequence an electric motor 36 is mounted in the instrument housing and is drivingly coupled to the shutter by reduction gearing. The reduction gearing takes the form of a pinion 37 on the output shaft of the motor 36, the pinion meshing with the toothed periphery 38 of the shutter disc. The electrical system 28 includes an energizing circuit for the motor 36, and this in turn is controlled by the microprocessor 15 (FIG. 1) so as to energize the motor at timed intervals and so align each of the three operative positions in sequence with the photomultiplier window for timed durations.

As previously stated, the operation of the thermoelectric device 39 for cooling and warming the mounting plate 29, so as to condense air moisture onto the mounting plate or evaporate condensed moisture from it, is controlled by signals from the microprocessor 15. All electrical connections to the instrument for supplying power, providing control signals and deriving output signals are led through suitable couplings 40.

A heat sink 41, consisting of a finned block of aluminium and the thermally conductive plate 45, is bolted to the base of the instrument housing 20, the mounting block 29 being in good heat conductive relation to it.

Figure 5A:
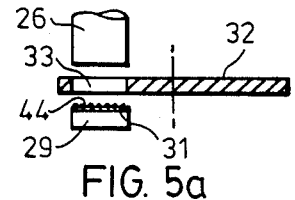
FIGS. 5a, 5b, 5c and 5d are fragmentary sectional views of the shutter showing a sequence of steps in a measuring operation.
Figure 5B:
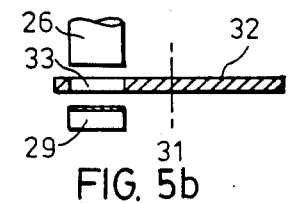
Figure 5C:
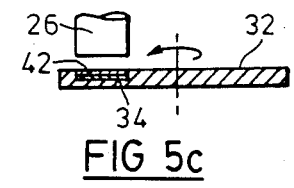
Figure 5D:
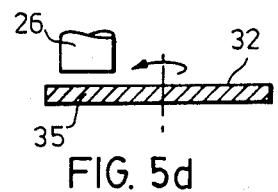

FIGS. 5a, 5b, 5c and 5d illustrate the four steps of the measurement procedure in the presence of beta-emitting radioactive gases. This is easily adapted to conditions where no beta-emitting radioactive gases are present, as described above. The first shutter position, in which scintillator 31 is exposed to the photomultiplier window is illustrated in FIGS. 5a and 5b, while the second shutter position, in which the reference scintillator 42 is exposed to the photomultiplier window, is illustrated in FIG. 5c. The third shutter position in which neither scintillator is exposed to the photomultiplier window is illustrated in FIG. 5d. The scintillator 31 consists of a thin film of plastic scintillator material (Type NE102 manufactured by Nuclear Enterprises) which is deposited on an aluminized Mylar ("Mylar" is a trade mark) substrate, the substrate being 1 to 8 mg/cm$^2$ thick and having good light reflecting properties as well as good mechanical properties for supporting the film. The reference scintillator 42 is similar to the scintillator 31 in all respects except that it is covered by a thin, transparent foil of clear Mylar 5 mg/cm$^2$ thick such that no air can come into contact with the film of scintillator material.

In FIG. 5a the mounting plate 29 has been cooled by the thermoelectric device 39 so as to condense a film of air moisture 44 onto the upper surface of the scintillator 31. The shutter 32 is shown in the first of its three operative positions with the aperture 33 aligned with the photomultiplier window and the scintillator 31. In these conditions the first measurement of the measurement procedure is taken.

FIG. 5b also shows the shutter 32 in the first operative position, with the aperture 33 aligned with the scintillator 31 and the window of the photomultiplier 26. However, the thermoelectric device 39 has now been operated so as to warm the mounting plate and evaporate the film of moisture 44. In these conditions the second measurement of the measurement procedure is taken.

In FIG. 5c the shutter 32 has been rotated to the second operative position so as to mask the scintillator 31 (not shown in FIG. 5c) while exposing the reference scintillator 42 to the window of the photomultiplier. The third measurement of the measurement procedure is now taken.

In FIG. 5d the shutter 32 has been rotated to the third of its operative positions with neither of the scintillators 31, 42 exposed to the photomultiplier window. In this condition the fourth measurement of the measurement procedure is taken.

The output signals representative of four measurements are processed, along with the temperature and relative humidity signals from the sensors 13, 14 (FIG. 1) by the microprocessor 15 to provide a numerical display indicating the concentration levels in air of elemental tritium and tritium oxides, respectively.

It will be appreciated that the four steps of the measurement procedure can be carried out repeatedly in cyclic succession, thereby providing a display which is continually updated as frequently as is required.

What we claim is:

1. An instrument for measuring levels of concentration of tritium oxides and/or elemental tritium in air, comprising:
    an instrument housing providing an inlet and an outlet for air to be monitored,
    a light sensing device mounted therein, the light sensing device having a window,
    circuit means connected to the light sensing device for deriving output signals therefrom proportional to the light sensed,
    a thermally conductive mounting block having a mounting surface spaced from the window for mounting a scintillator in viewing relationship thereto,
    means for flowing air to be monitored through the space between the mounting surface and the window,
    means for selectively cooling and warming the mounting block for condensing air moisture onto the scintillator and evaporating condensed moisture therefrom, and
    means for selectively exposing the scintillator to the window for timed durations.

2. A measuring instrument according to claim 1, wherein said means for selectively exposing the scintillator to said window comprises a shutter which is selectively movable across the field of view of said window, and operating means therefor.

3. A measuring instrument according to claim 2, wherein the shutter has an aperture which in one position of the shutter is aligned with the window for exposing the scintillator thereto, and further provides means for locating a reference scintillator at a position such that in a second position of the shutter the reference scintillator is exposed to the window, the reference scintillator being completely covered by a transparent layer of non-scintillating material having a thickness not less than 0.7 mg/cm$^2$ and not more than 5 mg/cm$^2$.

4. A measuring instrument according to claim 3, wherein the shutter is in the form of an opaque disc which is rotatable about its axis by said shutter operating means for sequentially exposing the scintillators to the window for said timed durations.

5. A measuring instrument according to claim 4, wherein the shutter operating means comprises an electric motor mounted within the housing and coupled to the rotatable disc via reduction gearing.

6. A measuring instrument according to claim 5, further comprising means for energizing the motor intermittently at timed intervals whereby to expose the scintillators to the window in sequence for respective timed durations.

7. A measuring instrument according to claim 3, wherein the shutter further provides means for shielding the scintillator from the window while the reference scintillator is remote from the window such that in a third position of the shutter neither scintillator is exposed to the window.

8. A measuring instrument according to claim 7, wherein the shutter is in the form of an opaque disc which is rotatable about its axis by said shutter operating means for sequentially exposing the scintillators to the window for said timed durations.

9. A measuring instrument according to claim 3, wherein the thermally conductive mounting block incorporates a thermoelectric device for selectively cooling and warming the mounting block.

10. A measuring instrument according to claim 9, wherein the mounting block is itself mounted in heat conductive relation to a heat sink.

11. An instrument for measuring levels of concentration of tritium oxides in air, comprising:
   an instrument housing providing an internal air flow path for air to be monitored, said air flow path having an inlet and an outlet,
   a photomultiplier mounted in the housing, the photomultiplier having a window,
   power supply means for operating the photomultiplier,
   output circuit means connected to the photomultiplier for deriving output signals therefrom,
   a temperature sensor located in the air flow path for sensing the temperature of air being monitored,
   a humidity sensor located in the air flow path for sensing the humidity of air being monitored,
   a thermally conductive mounting block having a mounting surface spaced from the photomultiplier window for mounting a first scintillator in viewing relationship thereto,
   means for selectively cooling and warming the mounting block for condensing air moisture onto the scintillator and evaporating condensed moisture therefrom,
   a shutter which is movable across the field of view of said window, the shutter having an aperture which in one position of the shutter is aligned with the window for exposing said first scintillator thereto, and further providing means for locating a reference scintillator at a position such that in a second position of the shutter the reference scintillator is exposed to the window, the reference scintillator being compleletely covered by a transparent layer of non-scintillating material having a thickness not less than 0.7 mg/cm$^2$ and not more than 5 mg/cm$^2$,
   means for selectivly operating the shutter at timed intervals for sequentially exposing the scintillators to the photomultiplier window for timed durations, and
   signal processing means responsive to the outputs of the temperature sensor and humidity sensor and sequential output signals from the photomultiplier for deriving therefrom a signal representative of tritium oxide concentration.

12. A measuring instrument according to claim 11, wherein the thermally conductive mounting block incorporates a thermoelectric device for selectively cooling and warming the mounting block.

13. A measuring instrument according to claim 12, wherein the mounting block is itself mounted in heat conductive relation to a heat sink.

14. A measuring instrument according to claim 12, wherein the shutter is in the form of an opaque disc which is rotatable about its axis by said shutter operating means for sequentially exposing the scintillators to the photomultiplier window for said timed durations.

15. A measuring instrument according to claim 14, wherein the shutter further provides means for shielding the scintillator from the photomultiplier window while the reference scintillator is remote from the photomultiplier window such that in a third position of the shutter neither scintillator is exposed to the window.

16. A measuring instrument according to claim 15, wherein the shutter operating means comprises an electric motor mounted within the housing and coupled to the rotatable disc via reduction gearing.

17. A measuring instrument according to claim 16, further comprising means for energizing the motor intermittently at timed intervals whereby to expose the scintillators to the window in sequence for respective timed durations.

* * * * *